United States Patent [19]

Govrin

[11] Patent Number: 5,412,737
[45] Date of Patent: May 2, 1995

[54] METHOD FOR IDENTIFYING FILM TYPE

[75] Inventor: Omri Govrin, Eschar Village, Israel

[73] Assignee: Scitex Corporation Ltd., Herzliya, Israel

[21] Appl. No.: 16,026

[22] Filed: Feb. 10, 1993

[30] Foreign Application Priority Data

Feb. 20, 1992 [IL] Israel ..................... 101029

[51] Int. Cl.⁶ ........................... G06K 9/46; G06K 9/66
[52] U.S. Cl. ..................... 382/168; 382/192; 348/96
[58] Field of Search ............... 382/18, 17, 36; 355/38; 358/522, 515; 348/96, 110, 111

[56] References Cited

U.S. PATENT DOCUMENTS

| | | | |
|---|---|---|---|
| 4,802,107 | 1/1989 | Yamamoto et al. | 364/525 |
| 4,816,903 | 9/1986 | Utsuda et al. | 358/76 |
| 4,829,371 | 5/1989 | Hiramatsu et al. | 358/80 |
| 4,830,501 | 5/1989 | Terashita | 356/402 |
| 4,929,979 | 5/1990 | Kimoto | 355/38 |
| 5,053,808 | 10/1991 | Takagi | 355/38 |
| 5,177,602 | 1/1993 | Fujimori | 358/522 |
| 5,241,378 | 8/1993 | Nishiguchi | 358/515 |
| 5,278,921 | 1/1994 | Nakamura et al. | 382/18 |

FOREIGN PATENT DOCUMENTS

| | | | |
|---|---|---|---|
| 0267793 | 5/1988 | European Pat. Off. | H04N 1/40 |
| 0267805 | 5/1988 | European Pat. Off. | H04N 1/40 |

OTHER PUBLICATIONS

R. W. G. Hunt, "The Reproduction of Color", Fountain Press, England, 1975, p. 101.

Primary Examiner—David K. Moore
Assistant Examiner—Michael R. Cammarata
Attorney, Agent, or Firm—Ladas & Parry

[57] ABSTRACT

A method for identifying the film type of a color input medium having picture and film border areas and which is scanned to produce an input image having a multiplicity of color separations having portions corresponding to the picture and border areas, the method including the steps of creating picture histograms of the picture area of the input image, defining a dark level and a bright level for each of the picture histograms and identifying a film type by comparing the dark and bright levels to predetermined thresholds defining predetermined characteristics of a given film type.

21 Claims, 10 Drawing Sheets

ORIGINAL IMAGE →

INCREASE SIGNAL - TO - NOISE RATIO -- 30

FILTERED IMAGE

CREATE LUMINANCE SEPARATION -- 32

ELIMINATE AREAS OF HIGH AND LOW CONTRAST -- 34

CREATE R,G,B AND L HISTOGRAMS -- 36

FOR ALL HISTOGRAMS, REDEFINE THE HIGHEST TRANSMISSION LEVEL SO AS TO ELIMINATE ANY PERFORATIONS AND FRAME DATA -- 38

DETERMINE DARK LEVELS DR, DG, DB AND DL.
DETERMINE BRIGHT LEVELS BR, BG, BB AND BL -- 42

DETERMINE: -- 44
RATIO BETWEEN RED AND GREEN DARK LEVELS RG_D
RATIO BETWEEN RED AND BLUE DARK LEVELS RB_D
RATIO BETWEEN RED AND GREEN BRIGHT LEVELS RG_B
RATIO BETWEEN RED AND BLUE BRIGHT LEVELS RB_B

PERFORM TESTS: -- 46
1) IS DR DARKER THAN A PRESET THRESHOLD R_DARK_TH?
2) IS BB BRIGHTER THAN A PRESET THRESHOLD B_BRIGHT_TH?
3) IS BL BRIGHTER THAN A PRESET THRESHOLD L_BRIGHT_TH?
4) IS RG_D SMALLER THAN THE THRESHOLD RG_D_TH?
5) IS RB_D SMALLER THAN THE THRESHOLD RB_D_TH?
6) IS RG_B SMALLER THAN THE THRESHOLD RG_B_TH?
7) IS RB_B SMALLER THAN THE THRESHOLD RB_B TH?

ORIGINAL IMAGE
- - - - - - - - - - - →

INCREASE SIGNAL - TO - NOISE RATIO -- 30

FILTERED IMAGE

CREATE LUMINANCE SEPARATION -- 32

ELIMINATE AREAS OF HIGH AND LOW CONTRAST -- 34

CREATE R,G,B AND L HISTOGRAMS -- 36

FOR ALL HISTOGRAMS, REDEFINE THE HIGHEST TRANSMISSION LEVEL SO AS TO ELIMINATE ANY PERFORATIONS AND FRAME DATA -- 38

DETERMINE DARK LEVELS DR, DG, DB AND DL.
DETERMINE BRIGHT LEVELS BR, BG, BB AND BL -- 42

DETERMINE: -- 44
RATIO BETWEEN RED AND GREEN DARK LEVELS RG_D
RATIO BETWEEN RED AND BLUE DARK LEVELS RB_D
RATIO BETWEEN RED AND GREEN BRIGHT LEVELS RG_B
RATIO BETWEEN RED AND BLUE BRIGHT LEVELS RB_B

PERFORM TESTS: -- 46
1) IS DR DARKER THAN A PRESET THRESHOLD R_DARK_TH?
2) IS BB BRIGHTER THAN A PRESET THRESHOLD B_BRIGHT_TH?
3) IS BL BRIGHTER THAN A PRESET THRESHOLD L_BRIGHT_TH?
4) IS RG_D SMALLER THAN THE THRESHOLD RG_D_TH?
5) IS RB_D SMALLER THAN THE THRESHOLD RB_D_TH?
6) IS RG_B SMALLER THAN THE THRESHOLD RG_B_TH?
7) IS RB_B SMALLER THAN THE THRESHOLD RB_B_TH?

FIG. 2

METHOD FOR IDENTIFYING FILM TYPE

FIELD OF THE INVENTION

The present invention relates to automatic detection of negative and positive slides.

BACKGROUND OF THE INVENTION

As is known in the art, color separation scanners process negative and positive slides in different ways. Therefore, prior art scanners require some indication from the operator as to whether the input medium to be scanned is a positive or negative slide. Example methods of providing indications are via a specific button or mechanical switch, or selecting from a menu on a screen.

The requirement of repeated indication can be irritating, troublesome and can cause time consuming mistakes, especially with scanners which automatically load input media to be scanned.

SUMMARY OF THE INVENTION

The present invention provides apparatus and method for automatically determining whether an input medium is a positive or negative slide.

Further, according to the present invention the determination of whether the input medium is a negative or a positive slide is based on characteristics of the input image itself.

Further, according to the present invention the determination is also based on a histogram analysis of each of the color separations of the input image.

There is provided in accordance with the present invention a method for identifying the film type of a color input medium having picture and film border areas and which is scanned to produce an input image having a multiplicity of color separations having portions corresponding to the picture and border areas. The method includes the steps of creating picture histograms of the picture area of the input image, defining a dark level and a bright level for each of the picture histograms and identifying a film type by comparing the dark and bright levels to predetermined thresholds defining predetermined characteristics of a given film type.

Further in accordance with the present invention the input image is comprised of pixels and in the creating of the picture histograms pixels generally similar to their surroundings and very different from their surroundings are eliminated.

In accordance with the present invention the picture histograms are created by creating first histograms from the input image and the defining the picture histograms as those portions of the first histograms extending from the origin to a first gap of at least a predetermined size.

Further in accordance with the present invention the multiplicity of color separations include red, blue and green color separations, and the dark and bright levels of the picture histograms include red dark and bright levels, green dark and bright levels, blue dark and bright levels and luminance dark and bright levels.

In order to identify the film type, it is determined whether:

a) the red dark level is darker than a predetermined threshold of between 1.44 and 2.25, b) the blue bright level is brighter than a predetermined threshold of between 0.27 and 1.0, c) the luminance bright level is brighter than a predetermined threshold of between 0.38 and 0.85;

d) the transmission ratio between the red and green dark levels is smaller than a predetermined threshold of between 0.2 and 0.9;

e) the transmission ratio between the red and blue dark levels is smaller than a predetermined threshold of between 0.1 and 0.7;

f) the transmission ratio between the red and green bright levels is smaller than a predetermined threshold of between 0.2 and 0.9; and;

g) the transmission ratio between the red and blue bright levels is smaller than a predetermined threshold of between 0.1 and 0.7.

A weighted average of the results of at least two of the comparisons in a) to g) is utilized to determine the film type.

BRIEF DESCRIPTION OF THE DRAWINGS

"The file of this patent contains at least one drawing executed in color. Copies of this patent with color drawings(s) will be provided by the Patent and Trademark Office upon request and payment of necessary fee."

The present invention will be understood and appreciated more fully from the following detailed description taken in conjunction with the drawings in which:

FIG. 2 is a flow chart illustration of a method of identifying negative and positive slides;

DETAILED DESCRIPTION OF PRESENT INVENTION

Figures 1A, 1B:
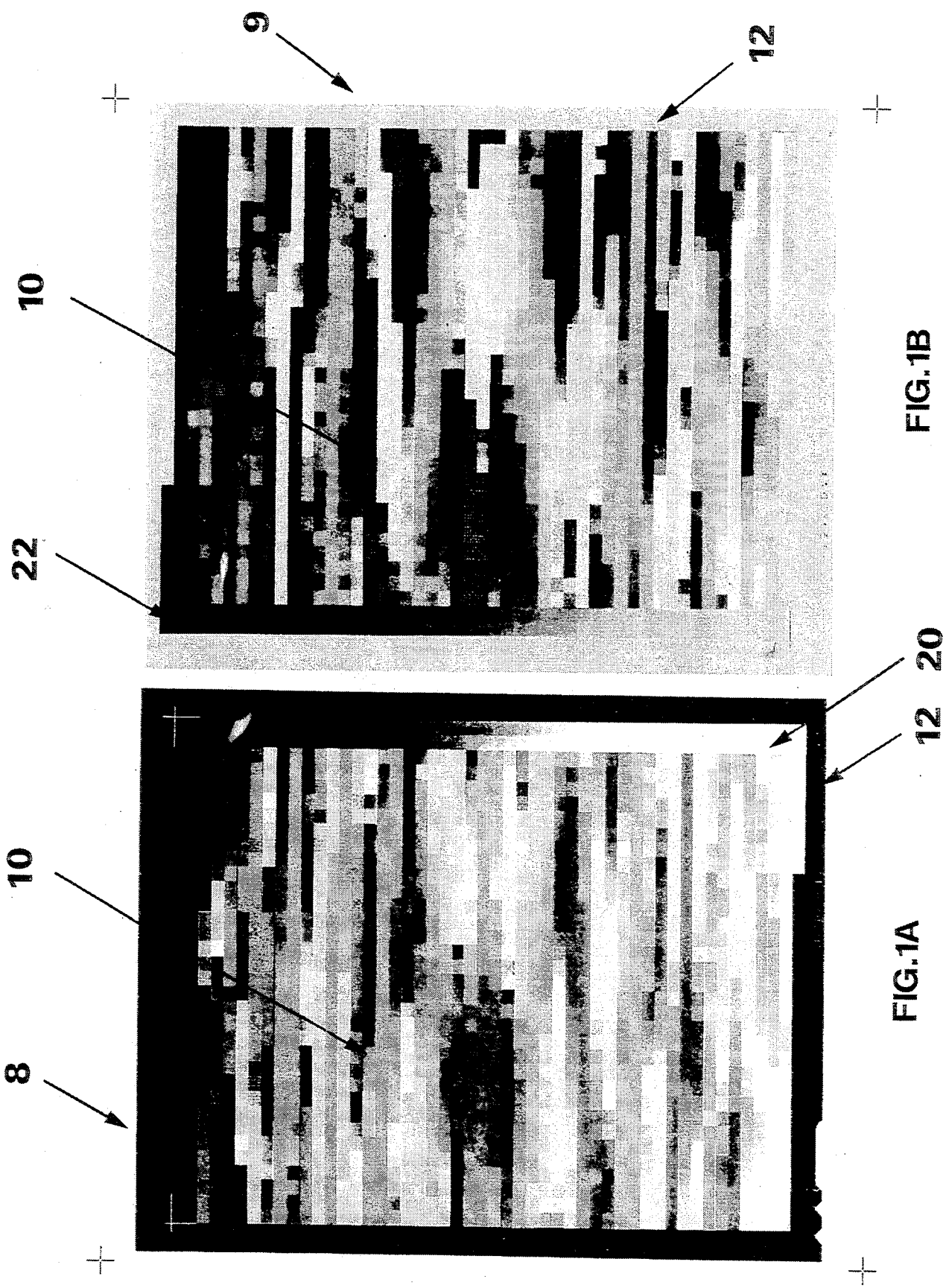
FIG. 1A is a color illustration of a positive slide.
FIG. 1B is a color illustration of a negative slide.

Reference is now made to FIGS. 1A and 1B which are color illustrations of an exemplary color positive slide 8 and an exemplary color negative slide 9, respectively. Each slide 8 and 9 has a picture area 10 and a film border area 12 where within the picture area 10 of the color positive 8 is a positive grey scale 20 and within the picture area 10 of the color negative slide 9 is a negative grey scale 22, indicating the range of grey values in the respective picture area 10.

As can be seen from FIGS. 1A and 1B, the color negative slide 9 is characterized by a strong cast, which is typically a shade of orange, and a low dynamic range. The strong cast is particularly noticeable in the film border area 12 of negative slide 9 and the low dynamic range is noticeable when comparing the positive grey scale 22 with that of the negative grey scale 20. The variety of grey tones is less in positive grey scale 22 than in negative grey scale 20.

In accordance with the present invention, the abovedescribed characteristics are utilized in identifying the presence of negative and positive slides.

Figure 1C:
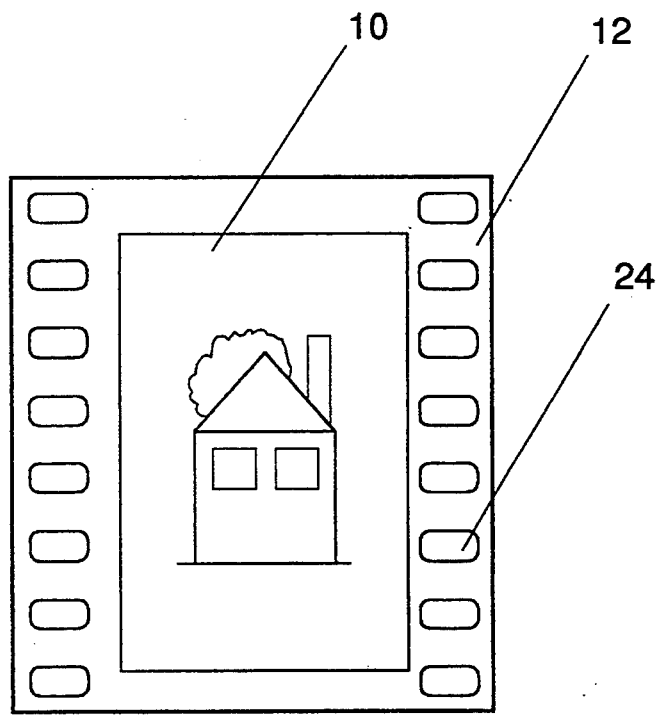
FIG. 1C is a schematic illustration of a 35 mm negative slide.

Another characteristic of some negative slides 9 is illustrated in FIG. 1C to which reference is now briefly made. FIG. 1C schematically illustrates a 35 mm negative which, as is known in the art, has perforations 24 in the film border area 12. The present invention can accommodate this characteristic.

Reference is now made to FIG. 2 which illustrates, in flow chart format, a method for identifying negative and positive slides.

The method of the present invention receives as input a digital image of an input medium, which is either a negative slide 9 or a positive slide 8. The digital image is a description of the input medium separated into its color separation components, typically in the Red-Green-Blue (RGB) color coordinate system. As is known in the art, the digital image is divided into a plurality of pixels (pixel elements) each of which has three RGB values which are typically in light transmission units.

The present invention provides a method of analyzing the input image. Through histogram analysis of the three color separations, the highlight and shadow density of the input image is computed.

Figure 3A:
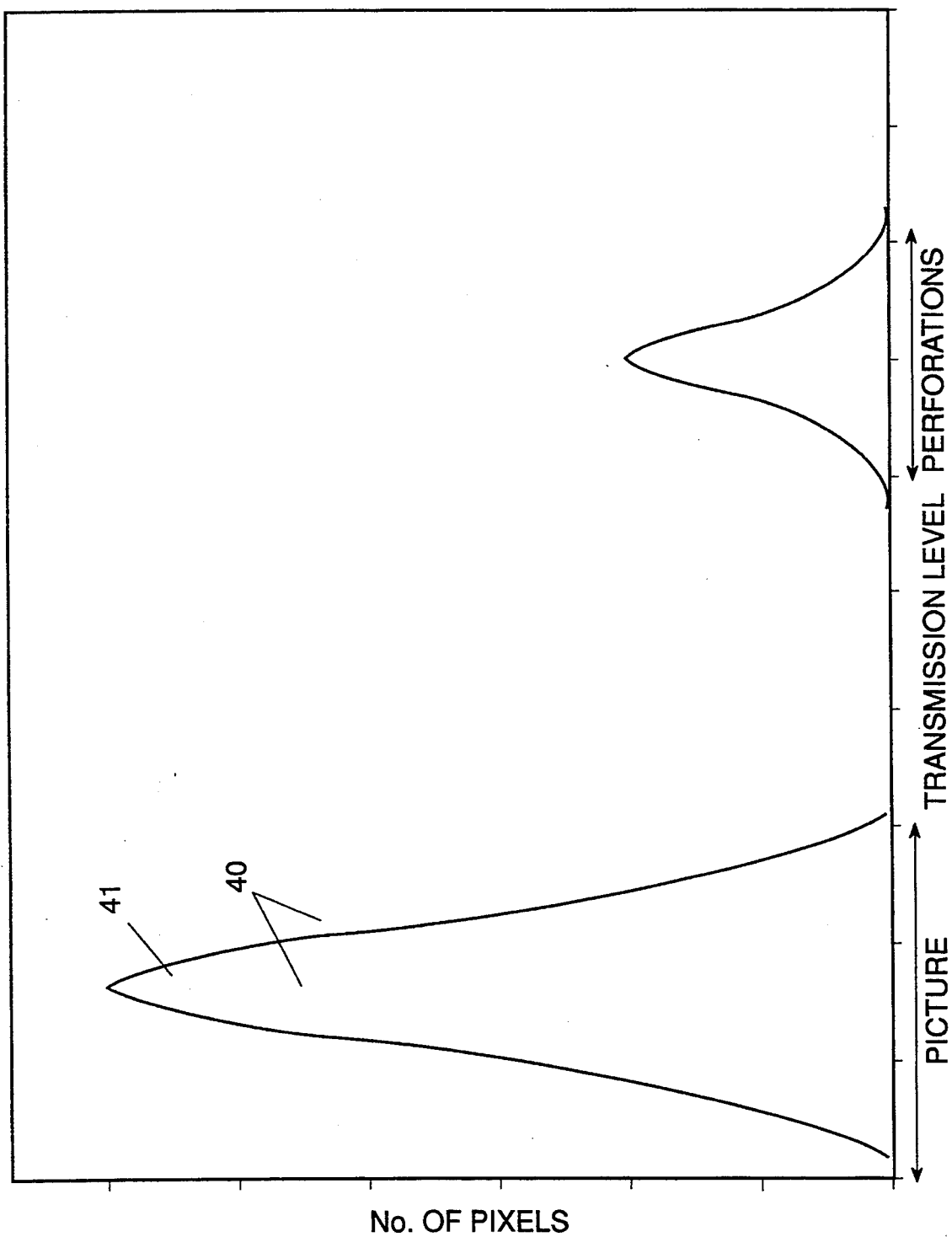
FIG. 3A is a graphical illustration of a histogram of transmission levels from a negative slide before processing, useful in the method of FIG. 2.

Since perforations 24 may add very bright values to the three separation histograms, artificially expanding the dynamic range of the negative slide 9 and since erratic scanning may place perforations 24 in the picture area 10, these values are eliminated in two ways: a) only "dynamic areas", areas with a sufficient (but not too large) transmission difference between neighboring pixels, are included in the histograms; and b) since histograms of negative slides 9 typically contain a large gap between values associated with both the film border 12 and perforations 24 and those associated with the picture area 10, the histograms only include data up to the large gap (see FIG. 3A).

Finally, quantitative criteria are used on the histograms produced after the elimination described hereinabove to determine whether the input medium is a positive or negative slide.

The method of the present invention begins, in step 30, by increasing the signal-to-noise ratio of the data of the input image. This can be accomplished by substituting, for each pixel, the average transmission value of the pixels in a n x m window around and including the pixel. The values of n and m depend on the resolution of the original image and on the physical size of the input medium. An example window might be of size 3×3 or 9×9. Step 30 produces a filtered image.

In step 32, a "luminance separation" L is produced from the filtered image to provide an indication of the brightness throughout the filtered image. As is known in the art and as described on page 101 of the book *The Reproduction Of Color*, by R. W. G. Hunt, Fountain Press, England, 1975, the luminance for any given pixel is approximately a weighted average of the transmission values of the three (red, green and blue) color separations for that pixel. The function for the luminance L can be written as follows:

$$L = a_1 R + a_2 G + a_3 B$$

where the weights, $a_1$, $a_2$ and $a_3$ depend on the specific scanner used. Typically, $a_1$ varies between 0.2 and 0.5, $a_2$ varies between 0.3 and 0.8 and $a_3$ varies between 0.2 and 0.2.

As is known in the art, the luminance is measured in density units where density is the negative log of the ratio of transmitted light to incident light.

In step 34, areas of very high contrast, such as typically occur at the edges between the perforations 24 and the film border 12, and areas of very low contrast, such as typically occur within the perforations 24 and the film border 12, are eliminated. If because of erratic scanning of the film frame, the perforations 24 appear within the picture area 10, this elimination process prevents at least some portion of perforations 24 from affecting the analysis.

The elimination is typically performed by first calculating the density difference, or alternatively, the luminance ratio, between a given pixel and its closest neighbors, typically the four closest neighbors. The density is indicated as:

$$\text{density} = -\log(\text{transmitted L/incident L}) \qquad (2)$$

Only if the maximum difference, or ratio, produced is between two predetermined values, defined herein as difmin and difmax, is the pixel utilized in later steps of the method. Difmin and difmax typically range between 0.01–0.7 density units for difmin and between 0.2–2.3 density units for difmax. Alternatively, the mean difference can be utilized.

In step 36, those pixels which have not been eliminated in step 34 are utilized to produce four histograms, one each for the red, green, blue and luminance separations. The histograms are graphs whose domains are transmission levels and whose ranges are the number of pixels having a given transmission level.

In step 38 any data from the perforations 24 which was not eliminated in step 34 is removed from each histogram. The data from the perforations 24 is typically much brighter than the data from the rest of the negative slide. This is shown in FIG. 3A, to which reference is now briefly made, where the transmission levels of data from perforations 24 are higher and separate from the data, shown as a curve 40, of the rest of the negative slide.

Figure 3B:
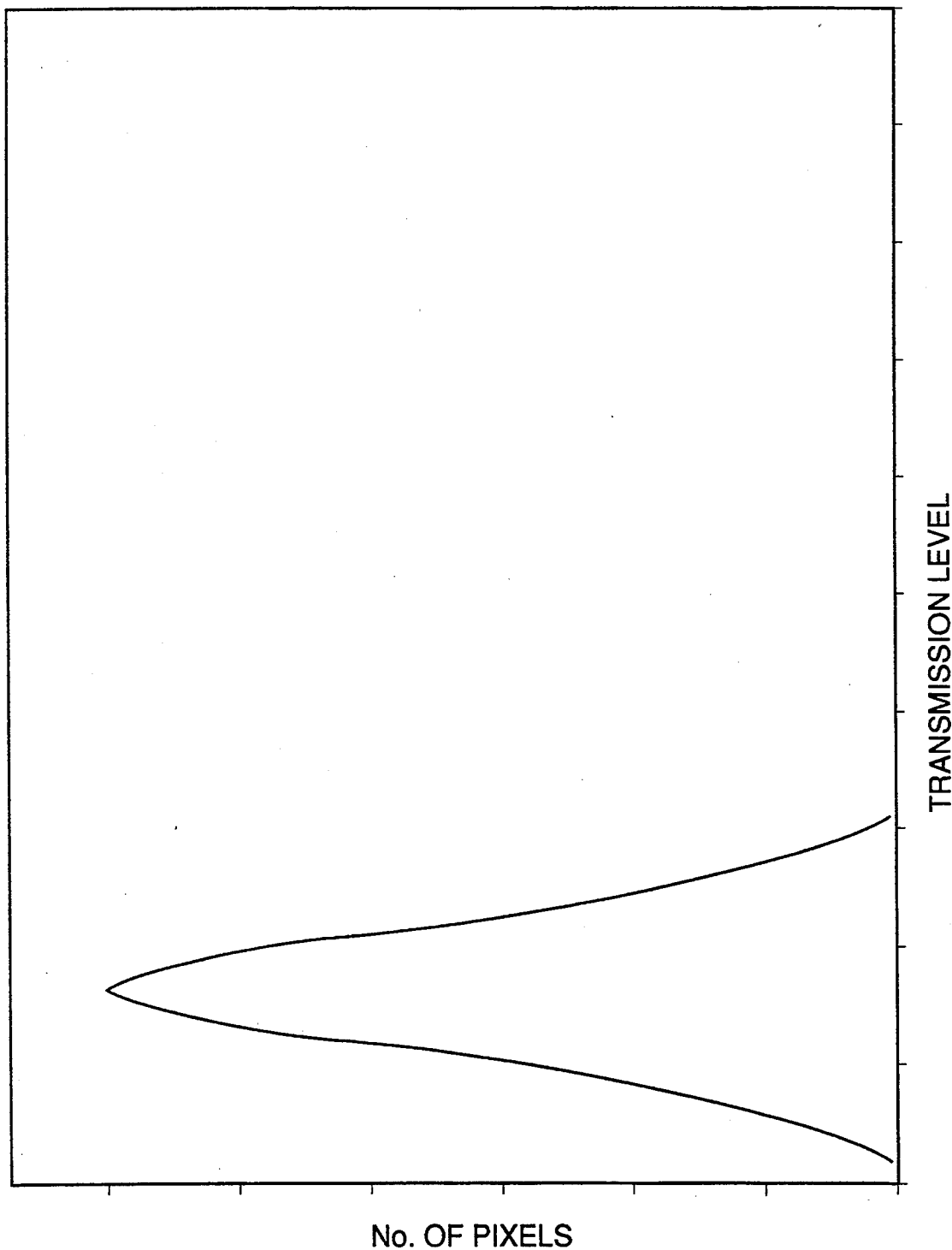
FIG. 3B is a graphical illustration of a histogram of transmission levels from a negative slide after processing, useful in the method of FIG. 2.

Therefore, in step 38, the highest transmission level of the histogram is redefined as the transmission level at the end of curve 40. The result of step 38 is shown in FIG. 3B.

The end of curve 40 is defined as the first transmission level for which the sum of the histogram values for a window succeeding the current transmission level is less than a predetermined threshold T. The end of curve 40 is found by first determining the transmission level having the largest number of pixels (i.e. a peak 41 of the histogram) and then performing the window calculations.

It will be appreciated that, since the histogram graphs number of pixels versus transmission levels, an integral under curve 40 within a window represents a percentage of the number of pixels in the filtered image.

The window is typically of a predetermined number K transmission levels wide, where K is typically between 5–100 transmission levels for a 12 bit resolution scanner and T is typically between 0.0–5 percent of the total number of pixels.

Figure 4:
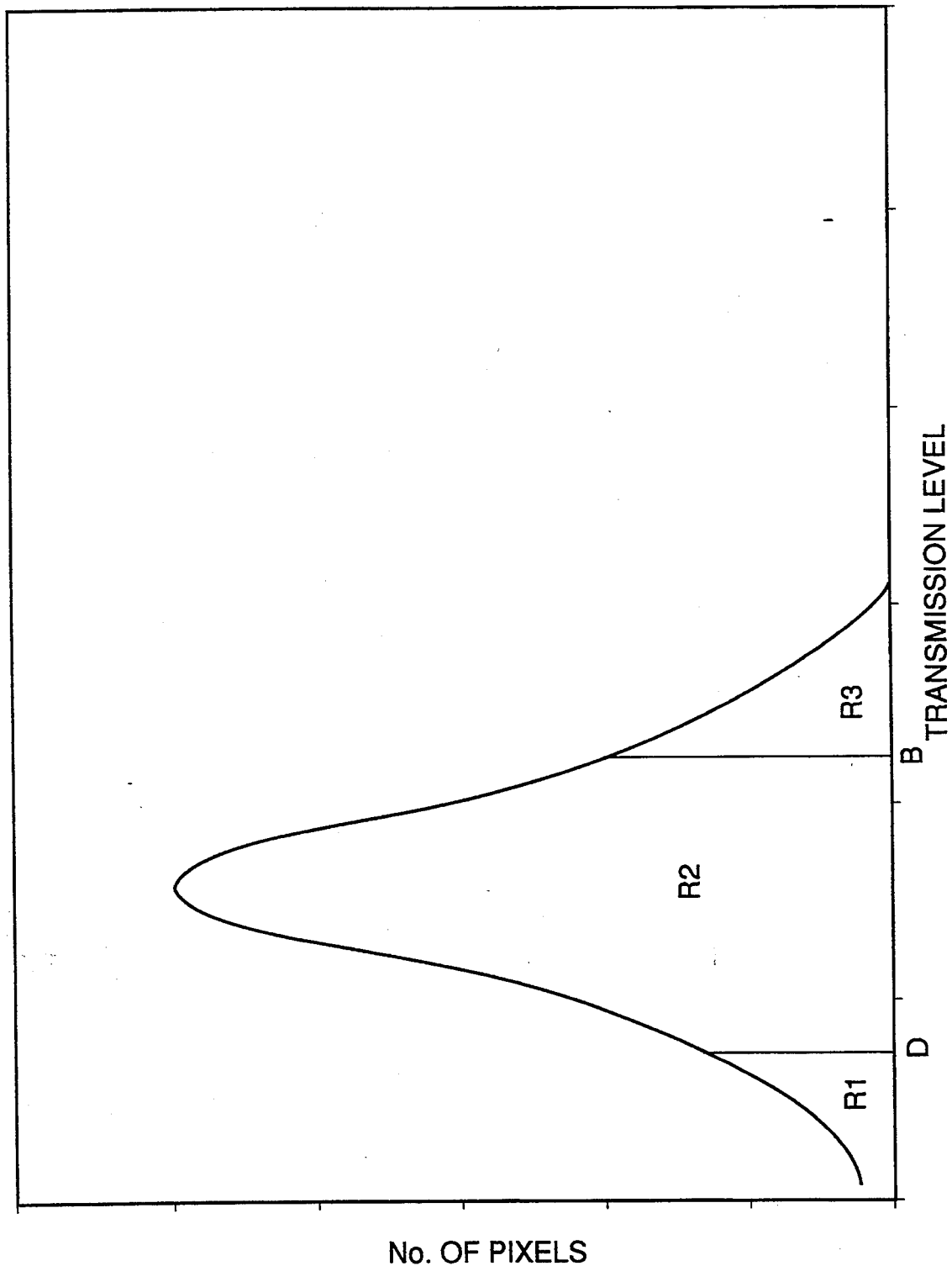
FIG. 4 is a graphical illustration of a histogram showing how the histogram can be used to define a dark level and a bright level, useful in the method of FIG. 2.

In step 42 dark levels and bright levels are determined for each histogram. The dark and bright levels, denoted D and B, are illustrated in FIG. 4 to which reference is now briefly made. FIG. 4 shows a typical histogram divided into three regions, R1, R2 and R3. The dark level is at the border of regions R1 and R2 and the bright level is at the border of regions R2 and R3.

The dark levels, denoted DR, DG, DB and DL for the red, green, blue and luminance separations, respectively, are those transmission levels just below which are a predetermined percentage, %D, of the pixels. Similarly, the bright levels, denoted BR, BG, BB and BL for the red, green, blue and luminance separations, respectively, are those transmission levels just below which are a predetermined percentage %B of the pixels.

Using FIG. 4 as an example, the dark level D and the bright level B are determined such that they divide the histogram into three regions R1, R2, R3, which comply with the following equations:

$$S_{R1}/(S_{R1}+S_{R2}+S_{R3}) = \%D \tag{3}$$

$$S_{R3}/(S_{R1}+S_{R2}+S_{R3}) = \%B \tag{4}$$

where %D and %B are predetermined values, and $S_{Ri}$ is the sum of the histogram values in the region $R_i$, Example values for %D and %B are between 0.01%–5% and between 90%–100%, respectively. It will be noted that to avoid problems of noise, the very darkest and the very brightest possible transmission levels are not selected; rather, transmission levels fairly close to the darkest and brightest transmission levels are selected.

Figure 5A:
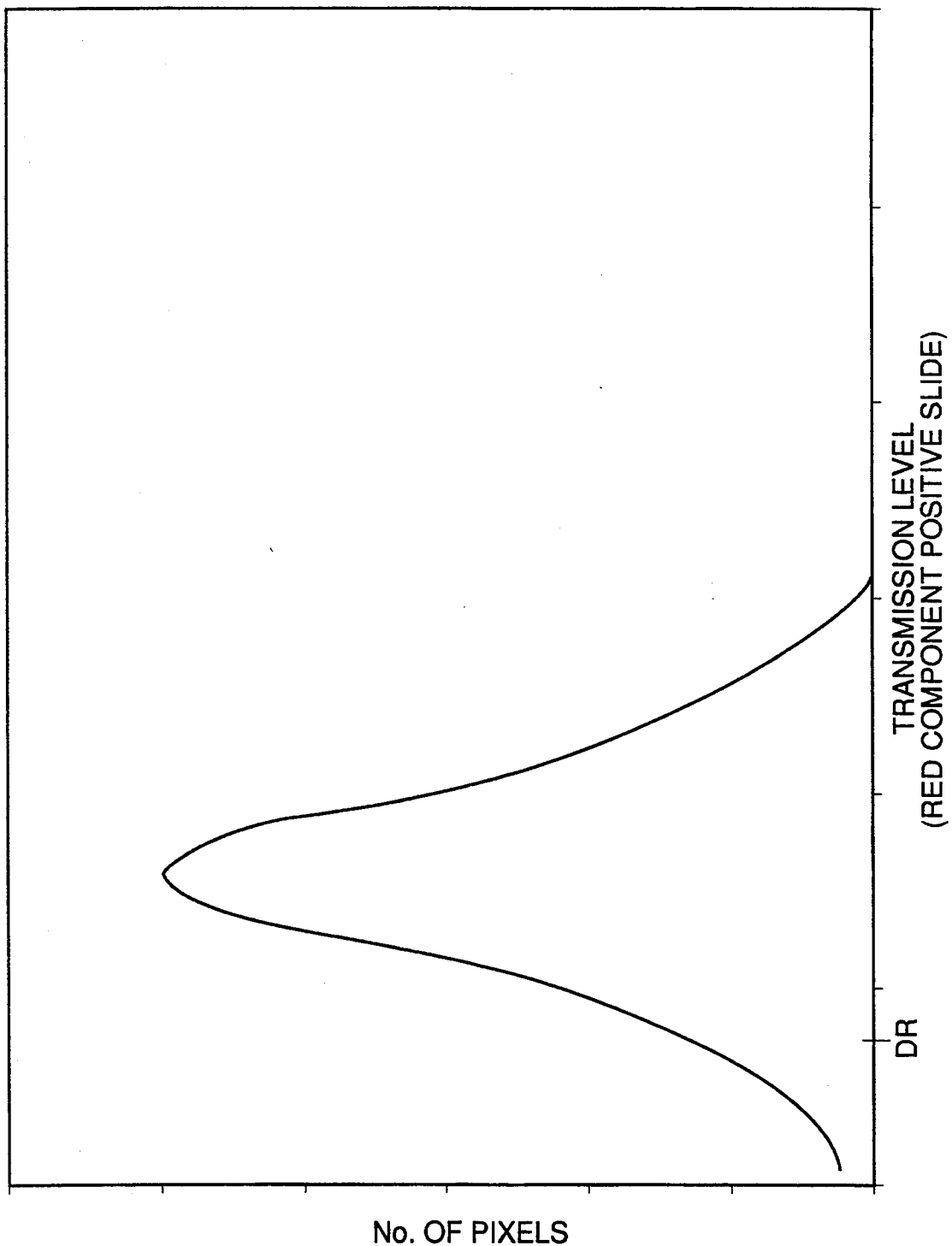
FIGS. 5A and 5B are graphical illustrations of histograms of positive and negative slides, respectively, showing the relative location of dark levels for red signals.
Figure 5B:
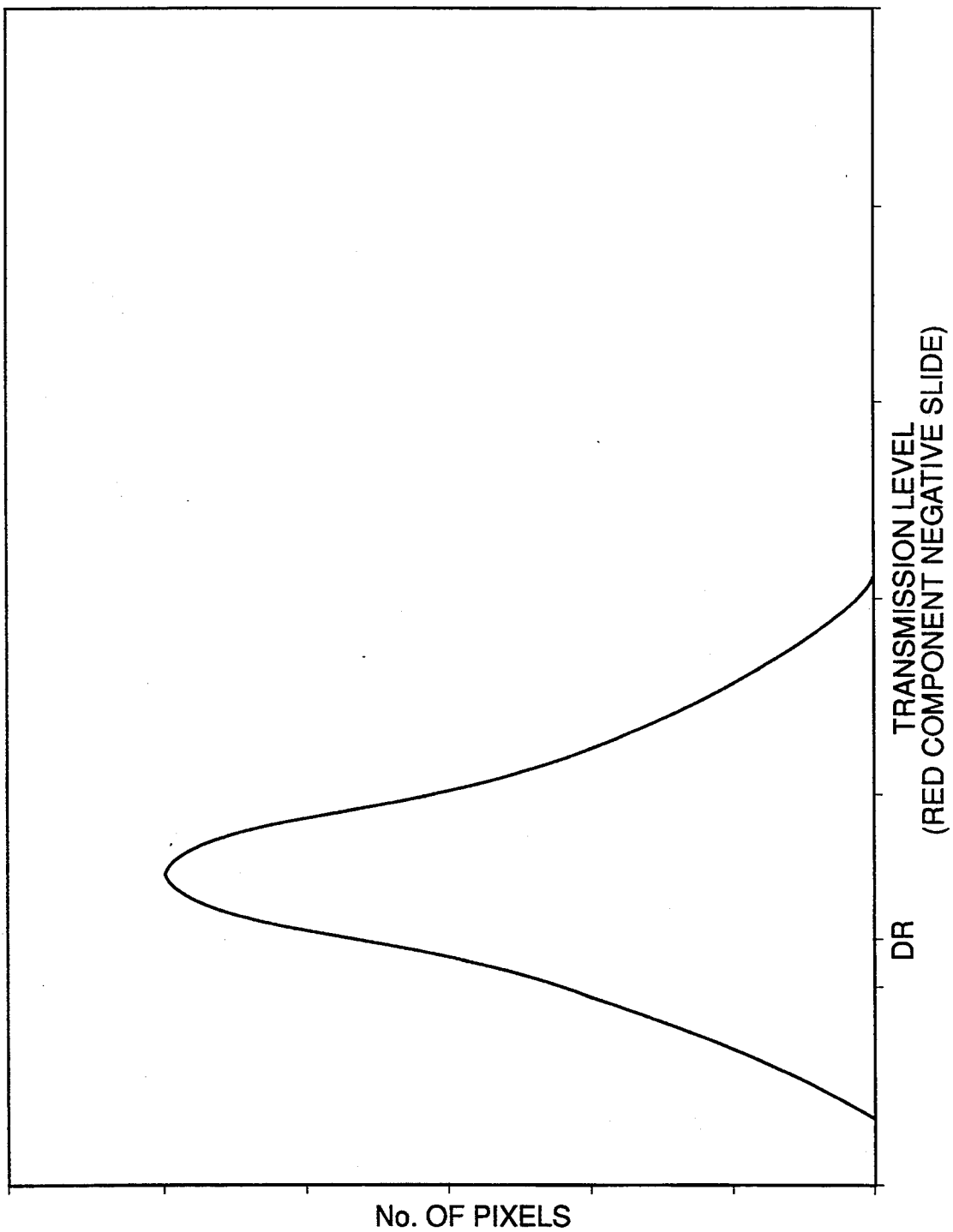

Because of the strong orange cast of color negative slides, the red dark level, DR, is at a high transmission level with respect to the other dark levels of the negative slide and with respect to the red dark level of a positive slide. This is shown in FIGS. 5A and 5B, to which reference is now briefly made, which respectively illustrate histograms for positive and negative slides. As can be seen, the red dark level DR is at a higher transmission level in FIG. 5B than it is in FIG. 5A.

The blue dark level is at a relatively low transmission level and the green dark level is between the red and blue dark levels.

The bright levels of negative slides show similar features: the red bright level is at a high transmission level, the green bright level is at a medium transmission level and the blue bright level is at a low transmission level, with respect to each other and with respect to the corresponding bright level of a positive slide.

Figure 6A:
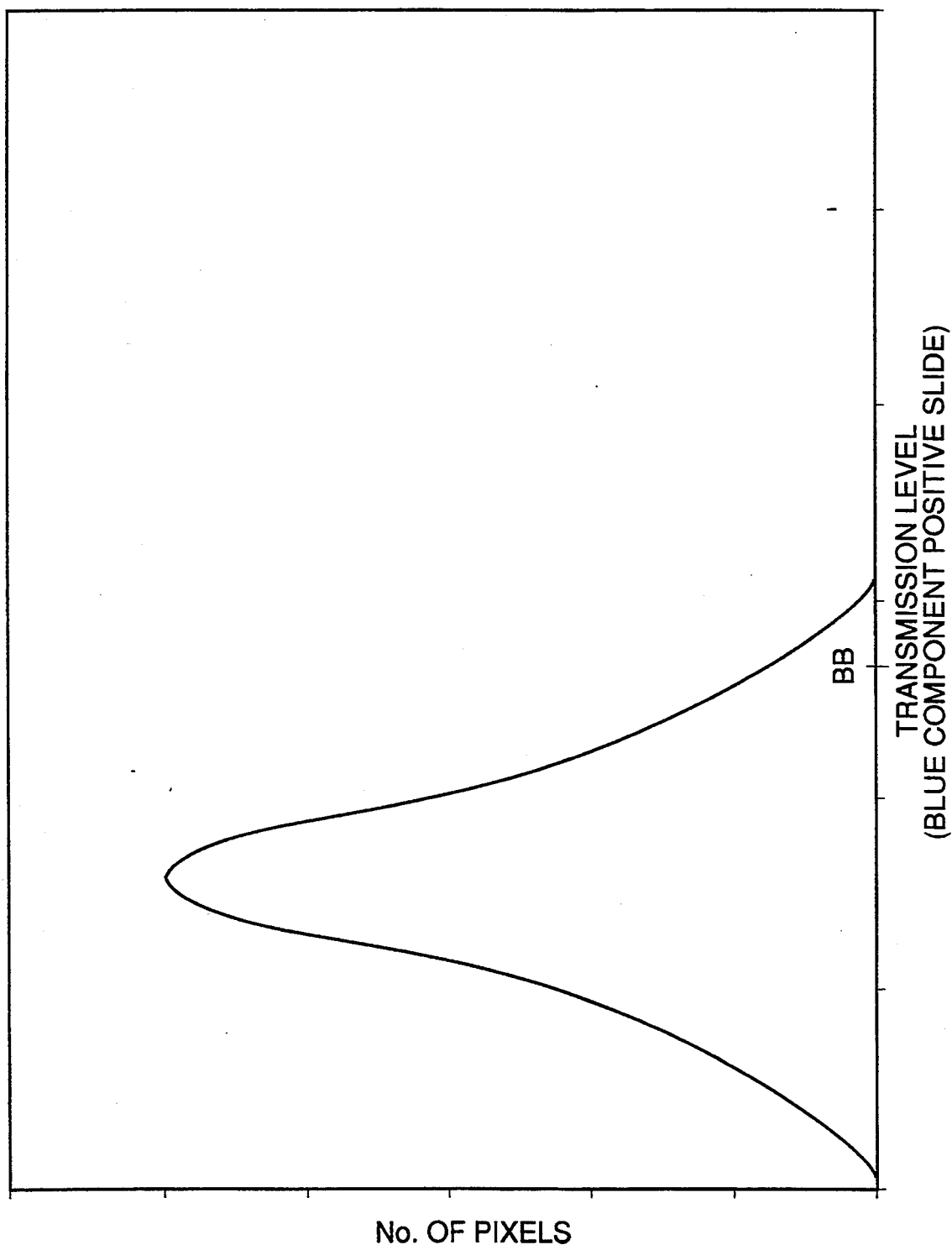
FIGS. 6A and 6B are graphical illustrations of histograms of positive and negative slides, respectively, showing the relative location of bright levels for blue signals.
Figure 6B:
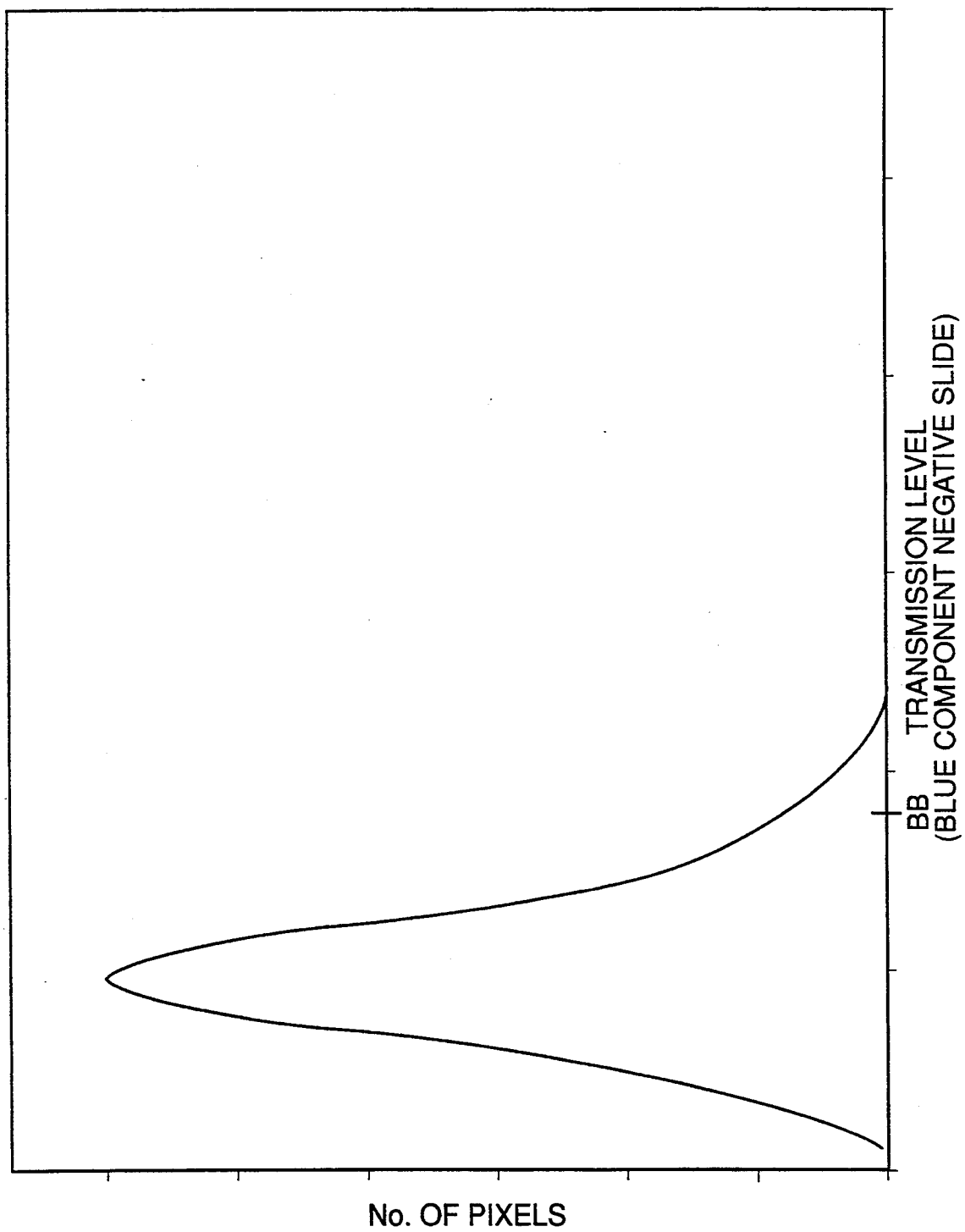

FIGS. 6A and 6B, to which reference is now briefly made, respectively illustrate histograms for positive and negative slides for blue signals. As can be seen, the blue bright level BB is at a higher transmission level in FIG. 6A than it is in FIG. 6B.

The discussion hereinabove indicates that, for any slide, the ratios between its red and green dark and bright levels and red and blue dark and bright levels are determinable and can be used to identify negative slides or positive slides. In step 44, the ratios described hereinabove are calculated.

Furthermore, as mentioned hereinabove, a positive slide is generally much brighter than a negative slide. Therefore, the luminance bright level BL is much higher for a positive than for a negative slide.

These characteristics are used to identify positive and negative slides in the tests described hereinbelow. Each test, on its own, can positively identify a positive or negative slide. Alternatively, the tests can be combined in any desired combination to more definitively identify a positive or negative slide. The selection of the tests depends on the required sensitivity and specificity of the identification. Furthermore, a combined weighted average of the results of all of the tests can be calculated to use as a quantitative criteria for identification.

It is noted that the tests are written herein such that a TRUE result identifies a positive slide. The thresholds are expressed in density units, but the equivalent transmission values can be used instead.

In step 46 the following tests are performed:
1) Is the red dark level DR less than a threshold density value rdarkth which typically ranges between 2.25–1,447 ?
2) Is the blue bright level BR greater than a threshold density value bbrightth, which typically ranges between 0.27–1.0?
3) Is the luminance bright level BL larger than a threshold density value lbrightth which typically ranges between 0.38–0.85 ?
4) Is the transmission ratio rgd between the red and green dark levels smaller than a threshold value rg d th which typically ranges between 0.2–0.9 ?
5) Is the transmission ratio rb d between the red and blue dark levels smaller than a threshold value rb d th, which typically ranges between 0.1–0.7 ?
6) Is the transmission ratio rgb between the red and green bright levels smaller than a threshold value rg b th which ranges between 0.2–0.9 ?
7) Is the transmission ratio rb b between the red and blue bright levels smaller than a threshold value rb b th which typically ranges between 0.1–0.7 ?

It will be appreciated by persons skilled in the art that the present invention is not limited to what has been particularly shown and described hereinabove. Rather the scope of the present invention is defined only by the claims which follow:

I claim:

1. A method for identifying the film type of a color input medium having picture and film border areas and which is scanned to produce an input image having a multiplicity of color separations having portions corresponding to said picture and border areas, the method comprising the steps of:

creating picture histograms for each color separation and for luminance values of said picture area of said input image;

defining a dark level and a bright level for each of said picture histograms; and identifying a film type by comparing said dark and bright levels to predetermined thresholds that define predetermined characteristics of a given film type.

wherein said multiplicity of color separations comprise red, blue and green color separations, wherein said dark and bright levels include red dark and red bright, green dark and green bright, blue dark and blue bright, and luminance dark and luminance bright levels.

2. A method according to claim 1 and wherein said input image is comprised of pixels and said step of creating picture histograms includes the step of eliminating pixels, the luminance of which differs from the luminance of neighboring pixels by more than a predetermined minimal luminance value.

3. A method according to claim 1 and wherein said input image is comprised of pixels and said step of creating picture histograms includes the step of eliminating pixels, the luminance of which differs from the luminance of said pixels neighboring pixels by less than a predetermined maximal luminance value.

4. A method according to claim 1 and wherein said step of creating picture histograms includes the steps of creating first histograms from said input image and defining said picture histograms as those portions of said first histograms extending from the origin to a first gap of at least a predetermined size.

5. A method according to claim 1 and wherein said step of identifying includes the step of determining whether said red dark level is darker than one of said predetermined thresholds corresponding to red dark levels.

6. A method according to claim 5; and wherein said predetermined red dark level threshold is within the range 1.44–2.25.

7. A method according to claim 1 and wherein said step of identifying includes the step of determining whether said blue bright level is brighter than one of said predetermined thresholds corresponding to blue bright levels.

8. A method according to claim 7 and wherein said predetermined blue bright level threshold is within the range of 0.27–1.0.

9. A method according to claim 1 and wherein said step of identifying includes the step of determining whether said luminance bright level is brighter than one of said predetermined thresholds corresponding to luminance dark levels.

10. A method according to claim 9 and wherein said predetermined luminance bright level threshold is within the range of 0.38–0.85.

11. A method according to claim 1 and wherein said step of identifying includes the step of determining transmission ratios between said red dark and green dark levels, said red dark and blue dark levels, said red bright and green bright levels and said red bright and blue bright levels.

12. A method according to claim 11 and wherein said step of identifying includes the step of determining whether said transmission ratio between said red dark and green dark levels is smaller than one of said predetermined thresholds corresponding to said ratio between red dark and green dark levels.

13. A method according to claim 12 and wherein said predetermined threshold is between 0.2 and 0.9.

14. A method according to claim 11 and wherein said step of identifying includes the step of determining whether said transmission ratio between said red dark and blue dark levels is smaller than one of said predetermined thresholds corresponding to said ratio between red dark and blue dark levels.

15. A method according to claim 14 and wherein said predetermined threshold is between 0.1 and 0.7.

16. A method according to claim 11 and wherein said step of identifying includes the step of determining whether said transmission ratio between said red dark and green bright levels is smaller than one of said predetermined thresholds corresponding to said ratio between red dark and green bright levels.

17. A method according to claim 16 and wherein said predetermined threshold is between 0.2 and 0.9.

18. A method according to claim 11 and wherein said step of identifying includes the step of determining whether said transmission ratio between said red dark and blue bright levels is smaller than one of said predetermined thresholds corresponding to said ratio between red dark and blue bright levels.

19. A method according to claim 18 and wherein said predetermined threshold is between 0.1 and 0.7.

20. A method according to claim 2 and wherein said dark levels are generally brighter than a first predetermined percentage of said pixels of said image and said bright levels are generally brighter than a second predetermined percentage of said pixels of said image.

21. A method according to claim 1 and wherein said step of identifying includes the steps of:
determining transmission ratios between said red dark and green dark levels, said red dark and blue dark levels, said red bright and green bright levels and said red bright and blue bright levels;
determining whether:
a) said red dark level is darker than one of said predetermined thresholds corresponding to red dark levels;
b) said blue bright level is brighter than one of said predetermined thresholds corresponding to blue dark levels;
c) said luminance bright level is brighter than one of said predetermined thresholds corresponding to luminance bright levels;
d) said transmission ratio between said red dark and green dark levels is smaller than one of said predetermined thresholds corresponding to said ratio between said red dark and green dark levels;
e) said transmission ratio between said red dark and blue dark levels is smaller than one of said predetermined thresholds corresponding to said ratio between red dark and blue dark levels;
f) said transmission ratio between said red bright and green bright levels is smaller than one of said predetermined thresholds corresponding to said ratio between red bright and green bright levels;
g) said transmission ratio between said red bright and blue bright levels is smaller than one of said predetermined thresholds corresponding to said ratio between red bright and blue bright levels;
producing a weighted average of at least two results of parts a–g of said second step of determining; and
utilizing said weighted average to determine said film type.

* * * * *

UNITED STATES PATENT AND TRADEMARK OFFICE
CERTIFICATE OF CORRECTION

PATENT NO. : 5,412,737
DATED : May 2, 1995
INVENTOR(S) : Omri Govrin

It is certified that error appears in the above-indentified patent and that said Letters Patent is hereby corrected as shown below:

Column 1, line 54, change "the" to -- then --.
Column 4, line 1, change "0.2" to -- - --0.2 --.
Column 8, lines 3 and 6, change "dark" to -- bright --.
Column 8, lines 11 and 14, change "dark" to -- bright --.

Signed and Sealed this

Fourth Day of June, 1996

BRUCE LEHMAN

*Attest:*

*Attesting Officer*      *Commissioner of Patents and Trademarks*